No. 655,127. Patented July 31, 1900.
J. STOCK.
FASTENING FOR WEARING APPAREL.
(Application filed Apr. 25, 1900.)
(No Model.)
Fig: 1.
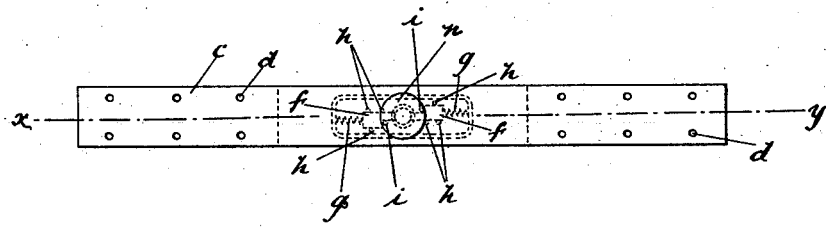
Fig: 2.
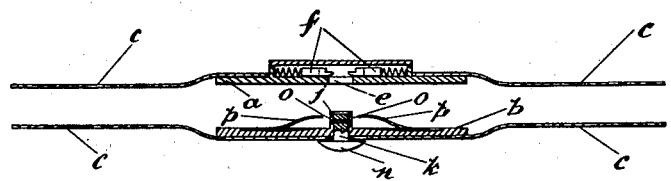
Fig: 3.
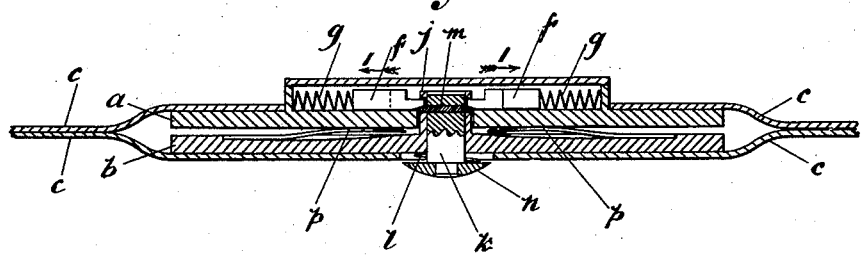
Witnesses:
Benjamin Clark.
Charles H. Briggs.
Inventor:-
Josef. Stock.
per:- E. Eaton.
His Attorney.

UNITED STATES PATENT OFFICE.

JOSEF STOCK, OF LONDON, ENGLAND.

FASTENING FOR WEARING-APPAREL.

SPECIFICATION forming part of Letters Patent No. 655,127, dated July 31, 1900.

Application filed April 25, 1900. Serial No. 14,339. (No model.)

*To all whom it may concern:*

Be it known that I, JOSEF STOCK, a subject of the Grand Duchy of Hesse, and a resident of Walthamstow, London, in the county of Essex, England, have invented certain new and useful Improvements in Fastenings for Wearing-Apparel, (for which I have applied for a patent in Great Britain, No. 21,247, dated October 24, 1899,) of which the following is a full, clear, and exact specification.

This invention consists of a new or improved fastener; and it consists of two sections which may be attached to any suitable material or objects to be fastened or connected together by means of a locking-catch, consisting of a projection upon one section adapted to engage in an aperture upon the other section, which is provided with spring catches or bolts for retaining the two sections together, a spring push piece or piston being provided for releasing the locking catches or bolts when required.

For purposes of illustration I will now refer to the annexed drawings, in which—

Figure 1 is a plan view of my invention; Fig. 2, a section through line X Y, showing the parts separated; Fig. 3, a section through line X Y in Fig. 1 to enlarged scale, showing the parts in their locking position.

For the purpose of illustration I have shown an arrangement which may be conveniently applied to skirt-bands or corsets.

$a$ and $b$ are the two sections to which the supports $c$, formed of suitable material, are attached in any convenient manner and having the apertures $d$ for enabling the attachment to be made to the desired object or article, such as by sewing or other convenient means. Although I have shown these supports $c$ as attachments, it will be readily understood that they may be formed integrally with the sections $a$ and $b$. The section $a$ is provided with the aperture $e$, and the locking bolts or catches $f$ are actuated by the springs $g$, so as to cause them to tend to project the required distance in relation to the aperture $e$.

$h$ shows points or guides for controlling the working bolts or catches $f$, the pins $i$ being for the purpose of bearing upon the shoulder formed on the bolts for regulating their protrusion.

$j$ is a projection attached to or formed upon the section $b$, in which the piston $k$ may slide, this piston $k$ being maintained in the position shown in Figs. 2 and 3 through the medium of the spring $l$.

$m$ is a pin which is passed through the piston $k$, so as to provide projections adapted to engage upon the inclined surfaces of the locking catches or bolts $f$ for the purpose of enabling them to be moved in the direction of the arrows 1 when it is required to release the two sections, this being effected by applying pressure upon the head $n$ of the piston $k$, the ends of the locking catches or bolts $f$ being thus forced or moved from the apertures or indentations $o$ and the projection $j$. As soon as this has been effected the action of the springs $p$, attached to the section $b$, will cause the separation to take place, as the relative strength of the springs $p$ and $l$ are arranged for this purpose.

It will be readily seen that a fastener constructed according to the principle of my invention may be adapted for various uses, such as glove-fastening studs and the like, as the shape or configuration of the sections will in that case be in conformity with the object for which they are to be employed.

Having thus described my invention, what I claim, and desire to secure by Letters Patent, is—

A fastener consisting of two sections adapted to be secured to the required object, one section carrying a projection having indentations or apertures, a piston having projections sliding in said projection, a spring controlling the movement of said piston, separating-springs attached to said section, an aperture in the other section, sliding bolts controlled by springs carried in said section, the ends of said sliding bolts being caused to project over the said aperture through the medium of the springs aforesaid, all in combination and substantially as described and illustrated herein and for the purpose set forth.

In testimony that I claim the foregoing I have hereunto set my hand this 5th day of April, 1900.

JOSEF STOCK.

Witnesses:
BENJAMIN CLARK,
GUSTAV JAEGER.